3,136,749
METHOD OF STABILIZING SULFUR-CONTAINING ORGANIC COMPOSITIONS
Helen Sellei Beretvas, Chicago, Ill., and Fausto Ramirez, Stony Brook, N.Y., assignors to Standard Oil Company, Chicago, Ill., a corporation of Indiana
No Drawing. Filed Dec. 29, 1961, Ser. No. 163,065
9 Claims. (Cl. 260—139)

This invention relates to a process for stabilizing sulfur-containing organic compositions by introduction of phosphorus into such compositions. More particularly, this invention relates to color stabilizing sulfur-containing organic compositions by a novel treatment of such compositions. The invention further relates to stabilized sulfur-containing organic compositions obtained by such treatment.

Sulfur-containing compositions, i.e. sulfurized organic compositions, and particularly those used as extreme pressure agents in lubricating oils, are often unstable and exhibit detrimental changes in color over periods of storage. Such detrimental changes in color are troublesome in that they make the sulfur-containing compositions unattractive to prospective purchasers. Often color standards are used by prospective purchasers of such compositions in view of a particular intended use. For example, when sulfurized compositions are to be used as cutting oils, it is especially desirable that the compositions have good color and good color stability so that the workpiece can be viewed therethrough during the cutting operation. A sulfurized composition having poor color and poor color stability can sufficiently darken the oil in which it is used to make such viewing virtually impossible. Although the sulfurized composition may have good color as produced, the instability of the composition especially under high temperature storage conditions such as may occur with outside storage in drums or tanks in direct sunlight, can render the composition unattractive or even unsuitable as a good quality extreme pressure (EP) agent for use in cutting oils.

It is an object of the present invention to provide a process for improving the color of such sulfur-containing or sulfurized compositions. It is a further object of the invention to provide stabilized sulfur-containing compositions which have been treated in accordance herewith. Such compositions may be useful, in addition to use in cutting oils or other metal working oils as gasoline addition agents for suppression of preignition and for improved octane requirement increase, as lubricant addition agents for improving corrosion inhibition and for imparting other improved properties to lubricants, fuels, and the like. It is a further object of this invention to provide in a particular embodiment cutting oil formulations containing the stabilized sulfur-containing compositons.

We have discovered that by treating sulfur-containing organic compositions, i.e. sulfurized organic compositions, in the liquid state, with an inorganic tri-valent phosphorus compound, the color of the sulfur containing composition is stabilized against darkening especially under higher temperature conditions such as may be encountered in storage. Accordingly, we have provided a method which includes the technique of treating such sulfurized organic compositions at low temperature with an inorganic tri-valent phosphorus compound. The color stability of the resulting composition is improved.

The treating with inorganic tri-valent phosphorus compound, as set out above, is carried out at low temperatures, i.e. temperatures below those normally used in the more severe conditions for phospho-sulfurization of an olefin. A suitable temperature range for the treating is 0 to 150° F. (or higher or lower). Ambient temperatures of contact below 0° F. are suitable but temperatures sufficiently high to cause excessive deterioration of the sulfurized composition should be avoided. After treating, the resulting product can be filtered to remove excess trivalent phosphorus compound. Alternatively, the trivalent phosphorus compound can be left in the material and will settle out with other bottoms materials during storage.

The advantage of cold contacting in the present process at relatively low temperature compared with contacting such sulfurized compositions at higher temperatures lies not only in the color stability result at such low temperature contacting but also in the elimination of the necessity for heating a reaction mixture to elevated temperatures in order to effect color stabilization with a phosphorus compound.

During the treating step, the amount of tri-valent phosphorus compound used will vary with the amount of color improvement and color stabilization desired. The darker compositions will usually require more tri-valent phosphorus compound for color improvement and the less stable sulfurized materials will usually require more trivalent phosphorus compound for color stabilization. In the preferred embodiment where it is desired to stabilize an extreme presssure agent for use in cutting oils, for example, we have found that the amount of tri-valent phosphorus compound required in the reaction is an amount usually sufficient to provide at least from about 0.01 to about 0.2 and more usually from about 0.05 to about 0.1 atom of phosphorus per atom of sulfur in the sulfurized composition. The atoms of phosphorus, of course, are in addition to other phosphorus which may be readily contained within the sulfurized composition.

In an especially preferred technique, the sulfurized composition is a sulfurized olefin (including sulfochlorinated and phospho-sulfurized olefins or mixtures thereof) and the sulfurized olefin is reacted with from about 1 to about 20 weight percent of the tri-valent phosphorus and separated from the remaining solids, e.g. by filtration or decanting. The separated product is capable of imparting extreme pressure characteristics to a cutting oil without, in view of its color stability, materially degrading the color of the oil.

The inorganic tri-valent phosphorus compound may be any such compound from which phosphorus is capable of being dissociated for addition to the sulfur-containing hydrocarbon. Such compounds include the sulfides, halides, oxides, hydroxides and acids of tri-valent phosphorus and more specifically include tetraphosphorous trisulfide ($P_4S_3$), tetraphosphorous heptasulfide ($P_4S_7$), triphosphorous hexasulfide ($P_3S_6$), phosphorous trichloride ($PCl_3$), phosphorous tribromide ($PBr_3$), phosphorous triiodide ($PI_3$), phosphorous trioxide ($P_2O_3$ or $P_4O_6$), and phosphorous trihydroxide and phosphorous acids ($H_3PO_3$, $H_4P_2O_5$, $HPO_2$, etc.) such as obtained from the hydrolysis of phosphorous halides and oxides. The preferred inorganic tri-valent phosphorus compounds are the sulfides and particularly preferred is tetraphosphorous trisulfide ($P_4S_3$). We have found that pentavalent phosphorus compounds do not impart appreciable phosphorus content to the compound under the contacting conditions herein set out.

The sulfurized organic compositions can conveniently be prepared by sulfurization, sulfochlorination, phosphosulfonation, or the like, of the synthetic or natural materials. Each of these reactions is well known to the art. Sulfurization is usually conducted by mixing the composition to be sulfurized with sulfur or a sulfur-containing inorganic compound such as sulfur monochloride or phosphorus pentasulfide at a temperature in the range from about 32° F. to about 600° F. The reaction is usually complete within a time of one to ten hours. More usual temperatures for reaction with sulfur and the sulfur chlorides fall in the range of 80–300° F. while the more usually phosphosulfurization temperatures are in the range of 300–500° F.

The sulfurized organic materials or compositions which may be used in the present process are the highly sulfurized unsaturated organic materials. In the preferred embodiment, such sulfurized materials have sufficient active sulfur to exhibit extreme pressure enhancing characteristics. Generally, such sulfurized organic compounds as organic sulfides and polysulfides, mercaptans, mercaptals, esters of thio and dithio acids, xanthates, sulfones, sulfone amides and sulfurized fatty bodies, the organic compounds being either aliphatic, cyclo-aliphatic or aromatic. Typical examples of such sulfurized organic compounds are dibenzyl sulfide, dodecyl hexasulfide, methylacetyl sulfide, lauryl mercaptan, dithioheptadecylic acid, sulfurized olefins, and the like. Advantageously, for high effectiveness and availability among the sulfurized natural organic compounds sulfurized fatty bodies such as sulfurized fatty oils, acids, esters and other sulfurized fatty bodies may be used. Particular examples of sulfurized fatty bodies include sulfurized sperm oil, lard oil, methyl oleate, degras, isopropyl oleate, cottonseed oil, corn oil, peanut oil, oleic acid, methyllinoleate, soy bean oil, tall oil, and the like. It is to be understood that the sulfurized organic compounds useable in this invention can contain other substituents and particularly other additional extreme pressure enhancing substituents besides sulfur such as chlorine groups. Particular examples of useable chlorine and sulfur-containing compounds are the phosphorus sulfide-hydrocarbon reaction products such as $P_2S_5$-polybutene reaction products, chlorinated alkylthiocarbonates, diparachlorobenzyl disulfide, chlorinated sulfides, chlorinated organic mercaptans, chlorinated cycloaliphatic or aromatic thiocyanates, sulfochlorinated olefins, and sulfochlorinated fatty bodies such as sulfochlorinated sperm oil, lard oil, corn oil, soy bean oil, and the like. The preferred sulfurized organic compounds for use in accordance with this invention are the sulfurized and sulfochlorinated unsaturated hydrocarbons such as polysulfides and particularly sulfurized and sulfochlorinated hydrocarbon olefins having from about 5 to about 30 or more and preferably from about 7 to about 18 carbon atoms.

Although we do not intend to be held to any theories, regarding the reaction of the tri-valent phosphorus with the sulfurized olefin material, the compositions produced differ from those prepared using pentavalent phosphorus during the treatment. Although phosphorus is added to the composition whether using the tri-valent phosphorus compound or a pentavalent phosphorus compound, the phosphorus imparted from a tri-valent phosphorus compound imparts high temperature color stability to the sulfurized composition while the phosphorus from a pentavalent phosphorus compound does not. Additionally, we have further found that more phosphorus goes into the sulfurized composition when using the tri-valent phosphorus compound than when using a pentavalent phosphorus compound. Additionally, the phosphorus from the trivalent phosphorus compound becomes included in or reacted with the sulfurized composition under much less severe temperatures, i.e. even at normal room temperatures or below.

The sulfurized compositions, more particularly defined above, contain reactive sulfur atoms which may change in valence from 2 to 4. It is believed that the tri-valent phosphorus compound unites readily with the active sulfur available in the sulfurized organic composition. The increased phosphorus content as well as the improvement in higher temperature color stability of the products prepared by treatment with a tri-valent phosphorus compound indicate a structure or composition within the stabilized product which is different in kind from the corresponding structure or composition deriveable from pentavalent phosphorus under like conditions and that the improved higher temperature color stability characteristic likely results from such difference. In any event, as will be more particularly pointed out below, comparison of characteristics of the compositions derived from tri-valent and pentavalent phosphorus serves to demonstrate an advantage flowing from the process of the present invention.

As stated above, the sulfurized compositions of the present invention are prepared by reacting sulfur or some other sulfurizing reagent with an unsaturated organic composition. As a typical example of preparation of such starting material for use in this invention by reaction of the unsaturated composition with sulfur, a mixture of 9 parts by weight of propylene tetramer and 10 parts by weight flowers of sulfur are heated at 300° F. for mild sulfurization of the propylene tetramer. A product with about 60% unreacted olefin, i.e. propylene tetramer, and 40% sulfurized propylene tetramer can be obtained. Such product usually has poor odor, low flash point and dark color (about 5 NPA, diluted). The dark color and color stability can be improved by treatment with tri-valent phosphorus in accordance herewith.

As another typical example, propylene tetramer is more severely sulfurized. Accordingly, a mixture of 3 parts by weight propylene tetramer and 1 part by weight flowers of sulfur are heated at 340° F. The resulting product may contain from 20 to 22% sulfur, indicating fairly complete sulfurization. Otherwise, the product resembles the product from mild sulfurization but is usually darker in color (e.g. higher than 8 NPA in the same dilution as the mildly sulfurized product.)

In the preferred embodiment of the present invention, the sulfurization is carried out using a sulfur chloride such as sulfur monochloride as the sulfurizing agent. The reaction with sulfur chloride is more commonly termed sulfochlorination. The sulfochlorination can be advantageously carried out in the presence of small amounts of water or even in the presence of solvent amounts of water, e.g. 30–200% by volume, and/or in the presence of a phosphorus sulfide such as $P_2S_5$ or $P_4S_3$ in amounts of 1 to 20% by weight or more or less, if desired. As a typical example of sulfochlorination, 1000 g. of a $C_7$ olefin (prepared by the polymerization of propylene with butylenes) are reacted with 700 g. (0.52 mole per mole of $C_7$ olefin) of sulfur monochloride in the presence of 100 g. of water and 100 g. (0.045 mole per mole of $C_7$ olefin) of $P_2S_5$. The reaction is started at a temperatures of 45° F. The reaction is exothermic and is permitted to proceed for three hours during which time the temperature is increased to about 80° F.

In preparing sulfochlorinated products for use herein, many process varations can advantageously be used. For example, after sulfochlorination the sulfochlorinated material can be neutralized by treatment with sodium carbonate for removal of labile chloride. Alternatively, the sulfochlorinated product can be refluxed in the presence of solvent amounts of water-alcohol mixtures or the like as taught by Beretvas et al. in application Serial No. 777,605, filed December 2, 1958, now U.S. Patent 3,007,911. Other treatment of the sulfochlorinated product, or of any of the sulfurized product, can also be effected where desired. However, because the treatment in accordance with the present invention usually improves the color of the sulfochlorinated product, additional treatment for color improvement may not be necessary or desired.

The treating step in accordance herewith can be effected by adding the tri-valent phosphorus compound to the sulfurized composition and agitating for a short period of time or can be effected by adding the tri-valent phosphorus compound to the sulfurized material and permitting the material to stand without agitation. For shorter treating times, i.e. where it is desired to separate the tri-valent inorganic phosphorus compound from the treatment mixture after treatment, it is preferred to agitate the mixture during treatment. We have used treating times ranging from about one minute to 64 hours both with agitating, e.g. by shaking or by magnetic stirrer, and without agitating. We have found that the length of treating time is relatively unimportant in that appreciable differences in results were not obtained.

Further, we have treated sulfurized compositions in accordance herewith with varying amounts of a tri-valent phosphorus compound, i.e. $P_4S_3$ and have determined that although in minimal amounts the degree of color stability may depend upon the amount of inorganic tri-valent phosphorus, where tri-valent phosphorus is used in excess of the amount necessary for maximum color stabilization, no additional advantage or detriment is effected by excess tri-valent phosphorus compound. The minimum amount useful for maximum color stabilization of a particular sulfurized composition can readily be determined by simple experimentation in accordance with the treating procedures of this invention.

As an example of a particular treatment in accordance herewith, a propylene tetramer is sulfurized at 200° F. with an equimolar amount of flowers of sulfur. The resulting product is so dark in color that true color cannot be measured. The sulfurization is repeated and the product is acid treated (sulfuric acid) to produce a lighter color sulfurized propylene tetramer and a product having a true color of about 184 may be obtained. The resulting product is divided into two portions and one portion is treated by adding thereto 10% $P_4S_3$, shaking for a few minutes and filtering unreacted $P_4S_3$ therefrom. The two portions are then subjected to aging for three weeks at room temperature and the true color of the untreated portion may increase to about 240 while the true color of the treated portion may remain at about 184. This example will demonstrate the ability of the present treating technique in stabilization of color even at room temperature (about 70° F.).

In another set of experiments carried out in accordance herewith, a $C_{17-18}$ terminal olefin of commercial purity was sulfochlorinated with about an equimolar amount of sulfur monochloride based on sulfur of the sulfur monochloride, i.e. about 0.5 mole $S_2Cl_2$ per mole of olefin. The product had a true color of about 15. Portions of the product were treated as set out below and aged at 130° F. for four weeks. The true colors were then again taken; the results were as reported in Table I below.

*Table I*

Treating agent: True color after 4 weeks at 130° F.
  None _____ 29
  10% $P_4S_3$ _____ 8
  20% $P_2S_5$ _____ 55

Another $C_{17-18}$ olefin sample was sulfochlorinated in the presence of water to produce a sulfochlorinated product for treatment in accordance with this invention. The sulfochlorinated product had a true color of about 11. A sample of the product after storage for four weeks at 130° F. had a true color higher than 60 while another sample, after treatment with 10% $P_4S_3$, after storage for the same length of time at the same temperature, had a true color of less than 5.

For purposes of comparison, experiments were conducted wherein pentavalent phosphorus compounds were used in the treatment step. Accordingly, samples of sulfochlorinated $C_7$ codimer (propylene butenes) were treated with the amounts of inorganic phosphorus reagents identified in Table II below without subsequent separation of inorganic phosphorus compound. The true color of the treated samples before and after aging at 130° F. for 24 hrs. are set out in Table II.

*Table II*

| Treating agent | True color [1] | |
| --- | --- | --- |
| | Before aging | After 24 hr. aging at 130° F. |
| None | 46 | 240 |
| 7.5% $P_4S_3$ | | 46 |
| 7.5% $P_2O_5$ | | [2] 58 |
| 10.0% $P_2S_5$ | | 184 |

[1] Computed from NPA color and dilution using chart in Industrial and Eng. Chem., February, 1926, p. 165.
[2] Formed dark sludge.

The true colors of the aged samples subjected to high temperature conditions demonstrate the improved color stability of the compositions of this invention treated with the tri-valent phosphorus compound.

In further experimentation to investigate the difference in compositions due to difference in phosphorus valence of the treating agent, it was found that the phosphorus content is increased more markedly when using the tri-valent phosphorus reagent than when using a pentavalent phosphorus reagent. By experimentation conducted by treating a sulfochlorinated $C_7$ codimer (prepared by reaction of sulfur monochloride with $C_7$ codimer in the presence of about 10% $P_2S_5$ and having a phosphorus content of about 0.6%), for example, this resulting difference in phosphorus content can be demonstrated. Accordingly, such a sulfochlorinated codimer is defined in three samples and the samples are treated with $P_4S_3$, $P_2S_5$ and $P_2O_5$ respectively. Usually the phosphorus content of the $P_4S_3$ treated sample is increased to about 1.2%, a gain of 0.6% of phosphorus while the treatment with $P_2S_5$ increases phosphorus content usually about 0.3% and the treatment with $P_2O_5$ increases the phosphorus content from close to 0 to 0.3%, giving compositions having about 0.6% to 0.9% phosphorus.

In further illustration of the present invention, various sulfurized hydrocarbon materials were treated at room temperature by agitating in the presence of varying amounts of various inorganic phosphorus compounds, both the tri-valent and pentavalent type. Accordingly, an aliquot of each sample listed herein below was treated with the amount of phosphorus-containing treating agent set out in Table III for 30 minutes while stirring with a magnetic stirrer. Thereafter, in aliquots to be aged at 80° F. as indicated in Table III, the supernatent fluid was separated from the inorganic phosphorus compound solids by either filtering or decanting. Where the aliquot was to be aged at 130° F., the supernatant fluid was not separated until after aging. True colors of the samples were taken before and after treating and true colors were again taken after subjecting the treated samples to various aging condtions. The aging conditions, i.e. temperature and aging time, are set out in Table III for each sample. The true colors were converted to a color intensity figure, a value which better points out the color improvement. The color intensity for each sample is based on 1.0 as the true color for the sample before aging. The color intensity of the samples after aging, of course, represent the reported multiple of true color and an increase in color intensity from 1 up to 5, for example, denotes five-fold darkening of the sample under the aging conditions. The phosphorus content of each sample before and after treating, where obtained, is also reported in Table III.

Sample A—A sulfochlorinated $C_7$ olefin (propylene-butylene codimer) neutralized with $Na_2C_3$.

Sample B—A sulfochlorinated $C_7$ olefin prepared by reacting about 0.5 mole of $S_2Cl_2$ with a propylene-butylene codimer in the presence of a solvent amount of equal volumes of water and isopropyl alcohol followed by refluxing for ½ to 1 hour at the solvent reflux temperature.

Sample C—A sulfochlorinated $C_9$ olefin prepared by reacting about 0.5 mole of $S_2Cl_2$ with a propylene trimer in the presence of about 10% water and 1% $P_2S_5$.

Sample D—A sulfochlorinated $C_9$ olefin prepared by reacting about 0.5 mole of $S_2Cl_2$ with a propylene trimer in the presence of 1% $P_2S_5$ and a solvent consisting of equal volumes of water and alcohol.

Sample E—A sulfochlorinated $C_{12}$ propylene tetramer prepared in the presence of about 10% water and 1% $P_2S_5$.

Sample F—A sulfochlorinated $C_{12}$ propylene tetramer prepared in the presence of 1% $P_2S_5$ and a solvent mixture consisting of equal volumes of water and alcohol.

Sample G—Octyl polysulfide, containing 39.7% sulfur.

The data reported in Table III above demonstrate the ability of the present treating technique to improve color stability of the sulfur-containing materials especially under high temperature aging conditions. In each case where

Table III

| Sample | Treating agent, wt. percent | True color | Before aging | Color intensity | | | | Phosphorus content, wt. percent | |
|---|---|---|---|---|---|---|---|---|---|
| | | | | After aging, 80° F. | | After aging, 130° F. | | Before treating | After treating |
| | | | | 3 weeks | 3 months | 3 weeks | 4 weeks | | |
| A | None | 264 | 1.0 | 1.8 | | 5.5 | | 0 | 129 |
| | 10% $P_4S_3$ | | 1.0 | 1.0 | | 1.8 | | | 0.07 |
| | 20% $P_2S_5$ | | 1.0 | 1.0 | | 3.7 | | | 0.17 |
| | 20% $P_2O_5$ | | 1.0 | 1.0 | | 4.9 | | | |
| B | None | 92 | 1.0 | 1.3 | | 5.6 | | 0 | 1.30 |
| | 10% $P_4S_3$ | | 1.0 | 1.4 | | 2.4 | | | 0.03 |
| | 20% $P_2S_5$ | | 1.0 | 1.4 | | 5.0 | | | 0.01 |
| | 20% $P_2O_5$ | | 1.0 | 1.0 | | 5.0 | | | |
| C | None | 97 | 1.0 | | | 5.3 | | 0.01 | ¹3.63 |
| | 5% $P_4S_3$ | | 0.3 | | | 1.3 | | | |
| D | None | 33 | 1.0 | | | 9.0 | | 0.028 | ¹2.28 |
| | 5% $P_4S_3$ | | 1.0 | | | 3.0 | | | ¹0.135 |
| E | None | 1,200 | 1.0 | | | 4.0 | | 0.123 | ¹0.992 |
| | 5% $P_4S_3$ | | | | | 1.3 | | | ¹0.481 |
| | 10% $P_2S_5$ | | | | | 4.0 | | | ¹0.042 |
| F | None | 75 | 1.0 | | | 20.0 | | 0.023 | ¹1.42 |
| | 5% $P_4S_3$ | | | | | 2.3 | | | ¹0.726 |
| | 10% $P_2S_5$ | | | | | 14.0 | | | |
| G | None | 9 | 1.0 | | 1.0 | | | 0 | 0.49 |
| | 10% $P_4S_3$ | 4 | 0.4 | | 0.13 | | | | |

¹ Phosphorus content taken after aging.

high temperature color stability was tested, the sample treated with tri-valent phosphorus compound exhibited excellent color stability when compared with either the untreated sample or the sample treated with pentavalent phosphorus compound. In the particular case of sample G, excellent improvement in color stability was evident even at the lower aging temperature; the color intensity decreased even further after three months storage under the low temperature aging conditions.

In accordance with this invention, the resulting treated sulfurized compositions have excellent color stability at high temperatures and are especially useful as extreme pressure addition agents in cutting oil compositions. The usual cutting oil bases can be used in formulating compositions containing minor amounts of the present invention, e.g. amounts of from .5 to 20 weight percent in cutting oil bases. Such cutting oil bases can conveniently be refined paraffin distillates such as those having viscosities in the range of 50–350 SSU at 100° F., synthetic polyolefins of like viscosity such as the non-irritating polybutenes, ester oils such as esters of adipic acid, sebacic acid and azaleic acid, etc. The cutting oil formulations containing extreme pressure agents prepared in accordance herewith can also contain, if desired, other addition agents such as emulsifying agents, oiliness agents, antifoam agents, and/or inhibiting agents and the like.

Further, cutting oil addition agent concentrates containing greater than 20% concentration of sulfurized materials treated in accordance herewith and/or other addition agents in a suitable oil-miscible solvent or cutting oil base can also be prepared.

All percentages herein are percentages by weight unless otherwise indicated.

We claim:

1. A method for improving the color stability of a sulfurized organic composition of the group consisting of sulfurized olefinic hydrocarbons and sulfochlorinated olefinically unsaturated hydrocarbons which method comprises treating said composition at a temperature in the range of from 0 to 150° F. in the liquid state with an amount of inorganic trivalent phosphorus compound sufficient to impart color stability to said composition.

2. The method of claim 1 wherein said sulfurized composition is a sulfochlorinated olefinically unsaturated hydrocarbon.

3. A method for improving the high temperature color stability of a normally liquid sulfochlorinated olefinically unsaturated hydrocarbon, which method comprises treating said sulfochlorinated hydrocarbon in the liquid state at a temperature in the range of 50–150° F. with a small amount of $P_4S_3$.

4. The method of claim 3 which includes the additional step of filtering the treated sulfochlorinated hydrocarbon.

5. The method of claim 3 wherein said treating is with from about 1 to about 20% $P_4S_3$ based on said sulfochlorinated hydrocarbon.

6. The method of claim 3 wherein said sulfochlorinated hydrocarbon is prepared by sulfochlorination in the presence of phosphorus pentasulfide.

7. A color stable sulfurized material prepared in accordance with the method of claim 1.

8. A sulfochlorinated hydrocarbon of good high temperature color stability prepared in accordance with the method of claim 3.

9. The method of improving the color stability of a sulfurized olefinic hydrocarbon, which method comprises treating said hydrocarbon with from about 1 to about 20 weight percent $P_4S_3$ at a temperature in the range of 50–150° F. and separating the treated liquid sulfurized material from solid $P_4S_3$.

References Cited in the file of this patent

UNITED STATES PATENTS 2,853,480  Lindert _____ Sept. 23, 1958
3,007,911  Beretvas et al. _____ Nov. 7, 1961

UNITED STATES PATENT OFFICE
CERTIFICATE OF CORRECTION

Patent No. 3,136,749                         June 9, 1964

Helen Sellei Beretvas et al.

It is hereby certified that error appears in the above numbered patent requiring correction and that the said Letters Patent should read as corrected below.

Column 6, line 72, for "$Na_2C_3$" read -- $Na_2CO_3$ --; columns 7 and 8, Table III, last column, line 2 thereof, for "129" read -- 1.29 --.

Signed and sealed this 13th day of October 1964.

(SEAL)
Attest:

ERNEST W. SWIDER                               EDWARD J. BRENNER
Attesting Officer                                     Commissioner of Patents